Figure 1:
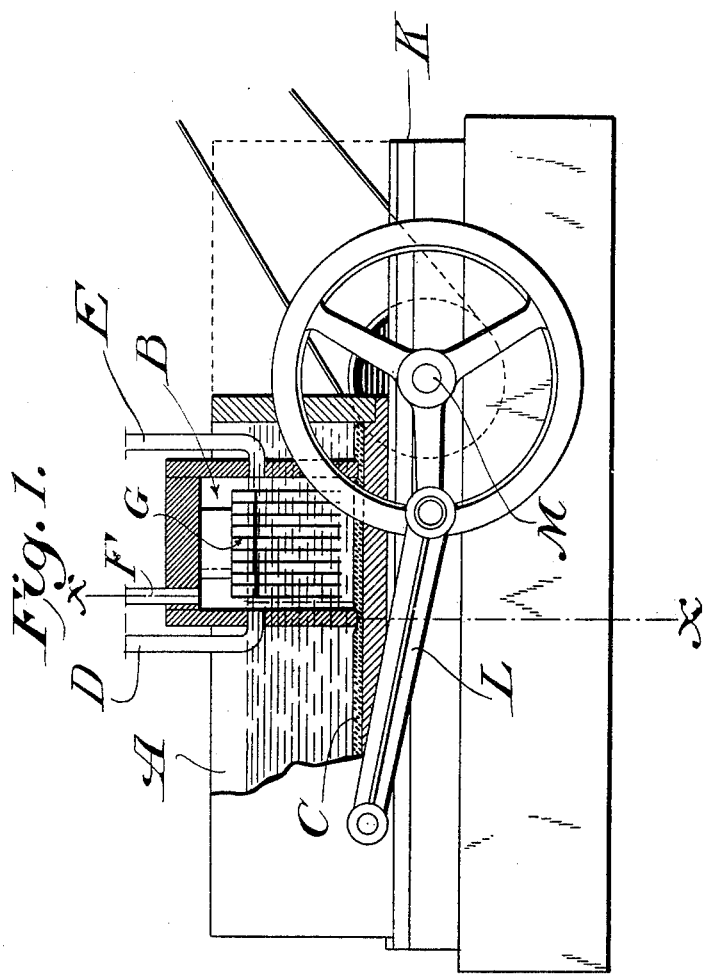

No. 679,476. Patented July 30, 1901.
J. F. KELLY.
ELECTROLYZING AND WASHING APPARATUS.
(Application filed Sept. 14, 1900.)

(No Model.) 2 Sheets—Sheet 1.

WITNESSES:
J. T. Hackley.
E. R. Newell

INVENTOR
John F. Kelly.
BY
R. C. Mitchell
ATTORNEY

No. 679,476. Patented July 30, 1901.
J. F. KELLY.
ELECTROLYZING AND WASHING APPARATUS.
(Application filed Sept. 14, 1900.)
(No Model.) 2 Sheets—Sheet 2.
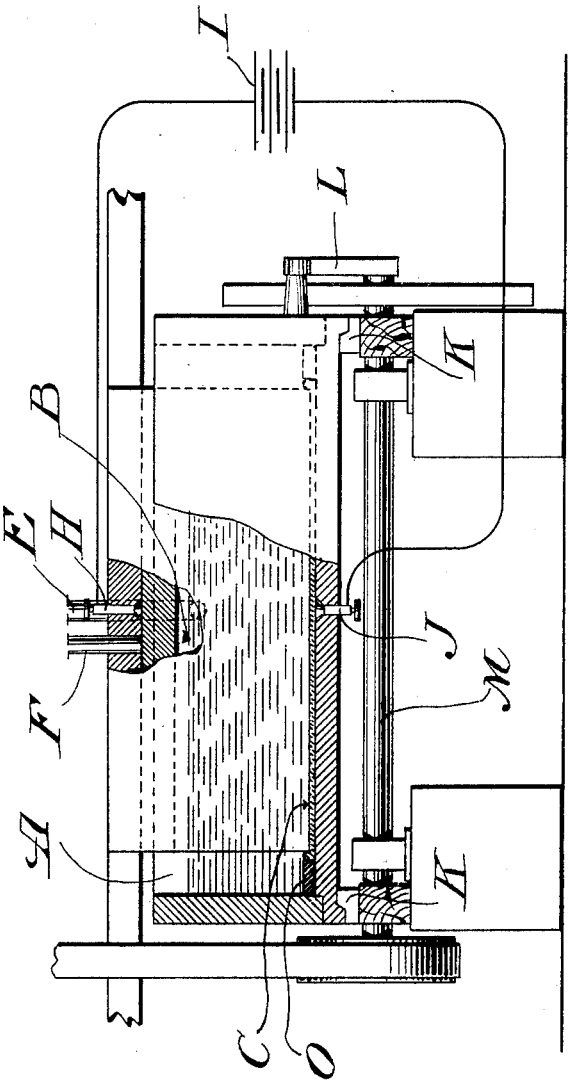
WITNESSES:
G. T. Hackley.
E. R. Unwell.
INVENTOR
John F. Kelly.
BY
R. C. Mitchell
ATTORNEY

UNITED STATES PATENT OFFICE.

JOHN F. KELLY, OF PITTSFIELD, MASSACHUSETTS.

ELECTROLYZING AND WASHING APPARATUS.

SPECIFICATION forming part of Letters Patent No. 679,476, dated July 30, 1901.

Application filed September 14, 1900. Serial No. 30,056. (No model.)

*To all whom it may concern:*

Be it known that I, JOHN F. KELLY, a citizen of the United States, residing at Pittsfield, Massachusetts, have invented certain new and useful Improvements in Electrolyzing and Washing Apparatus, of which the following is a full, clear, and exact description.

My invention relates to electrolyzing and washing apparatus, especially that intended for the production of caustic soda and chlorin from sodium chlorid, and has for its object to provide an apparatus which shall be simple and efficient in its construction and operation.

The following is a description of apparatus embodying my invention, reference being had to the accompanying drawings, in which—

Figure 1 shows a side view, partly in section, of the apparatus; and Fig. 2 shows an end view with portions cut away on the line $x$, Fig. 1.

Heretofore electrolytic apparatus for the production of caustic soda and chlorin has been made in which the chlorin and sodium have been separated from the saline solution, the chlorin escaping in the form of a gas and the sodium being incorporated to form an amalgam with mercury, after which the mercury has been caused to flow, so as to be exposed for washing. It has been found that in such apparatus used for this purpose the amalgam in flowing to the washing-chamber has been greatly disturbed and stirred into the uncharged mercury, so as to make it difficult to separate the sodium therefrom. By my invention, however, an apparatus is provided in the operation of which this disturbance and mixture of the charged and uncharged mercury will be prevented, the amalgam remaining practically undisturbed on the surface of the mercury and being carried to a point where it will be acted upon directly.

The apparatus consists of an external chamber A and an internal inverted chamber B, which divides the chamber into two subchambers connected by passages around the chamber B. The internal chamber B reaches to and is sealed by a layer of mercury C on the bottom of the external chamber A and constitutes the electrolyzing-chamber. It is provided with an inlet D and an outlet E for the brine and an outlet F for the gas, also a carbon anode G, electrically connected by the binding-post H to the circuit from one terminal of the generator I. The external chamber A is filled with water and constitutes the washing-chamber, the water being kept separate from the brine in the chamber B by the mercury seal. The mercury is connected to the circuit leading from the other terminal of the generator I by the binding-post J and constitutes the cathode. The chamber B is maintained stationary by supporting-framework, while the chamber A is reciprocated upon tracks K by the pitman L, which is operated by power applied to the shaft N. Neither the inner chamber nor the mercury extends across the entire width of the washing-chamber, enough space being left to permit the water to pass from one subchamber to the other. The mercury is kept in position by the raised portions O on the bottom of the chamber A.

In the normal operation of the apparatus the mercury surface immediately under the electrolyzing-chamber B becomes charged with sodium. If this sodium is not removed in time, secondary reactions occur, which are injurious to the efficiency of the apparatus. By the slow horizontal movement of the external chamber A a new surface of mercury is continuously brought under the influence of the electrolytic action within the chamber B, and the sodium-charged mercury is exposed to the action of the washing-water, so producing caustic soda. It will be noticed that the movement of the mercury is in a horizontal plane and that it is displaced, stirred, or disturbed but little, if at all. From this it results that the amalgam surface is brought practically intact into direct contact with the washing solution and the sodium more easily and quickly eliminated than would be the case if the uncharged mercury and amalgam were thoroughly mixed and incorporated, as in apparatus used heretofore. In my apparatus practically all the mercury is alternately charged and washed, thus utilizing it to the fullest extent. The reciprocation of the mercury by reason of the momentum which is imparted to it and the complete stopping of the heavy moving fluid at each time the motion is reversed results in a different and better action than would be present if the vessel containing the mercury were moved continuously in one direction or were stationary.

What I claim is—

1. The combination of a washing-chamber, an electrolyzing-chamber dividing said washing-chamber into two variable subchambers, a mercury cathode in said washing-chamber constituting a seal for said electrolyzing-chamber, and means for imparting to said washing-chamber and the body of said mercury a forcible reciprocating horizontal movement.

2. The combination of a washing-chamber, an electrolyzing-chamber within said washing-chamber, a mercury cathode in said washing-chamber constituting a seal for said electrolyzing-chamber, tracks supporting said washing-chamber and a crank and pitman for imparting to said washing-chamber a reciprocating movement upon said tracks and a forcible reciprocating movement to the body of said mercury.

3. The combination of a washing-chamber, an electrolyzing-chamber dividing said washing-chamber into two subchambers with means for permitting the washing fluid to pass around said electrolyzing-chamber, a mercury cathode in said washing-chamber constituting a seal for said electrolyzing-chamber, means for imparting to said washing-chamber and the body of the mercury a forcible reciprocating motion, and means for blocking the passage of the mercury around said electrolyzing-chamber.

Signed at Pittsfield, Massachusetts, this 12th day of September, 1900.

JOHN F. KELLY.

Witnesses:
C. C. CHESNEY,
M. L. NICHOLS.